United States Patent
Crehore

[15] 3,665,896
[45] May 30, 1972

[54] TWO-CYCLE ENGINE

[72] Inventor: Robert Crehore, 414 East Frye Avenue, Peoria, Ill. 61603

[22] Filed: May 13, 1971

[21] Appl. No.: 143,100

[52] U.S. Cl..............................123/18 A, 123/1 A, 123/119 E
[51] Int. Cl............................................................F02b 53/00
[58] Field of Search......................123/18 R, 18 A, 1 A, 119 E

[56] References Cited

UNITED STATES PATENTS

| | | | |
|---|---|---|---|
| 1,352,127 | 9/1920 | Henderson | 123/18 A |
| 1,584,567 | 5/1926 | Thorpe | 123/18 |
| 2,127,743 | 8/1938 | Linthwaite | 123/18 A |
| 2,416,846 | 3/1947 | Richter | 123/18 A |
| 2,651,206 | 9/1953 | LaVeille | 123/18 A X |
| 2,899,945 | 8/1959 | Carvalho | 123/18 A |

*Primary Examiner*—Laurence M. Goodridge
*Attorney*—Johnson, Dienner, Emrich, Verbeck & Wagner

[57] ABSTRACT

A two-cycle engine having banks of arcuately reciprocating pistons interconnected such that the banks of pistons move in opposite arcuate reciprocating directions, and including novel fuel vapor inlet and exhaust valve means adapted for employment of hydrogen and oxygen input vapor gases whereby to substantially eliminate exhaust air pollutants.

12 Claims, 7 Drawing Figures

Patented May 30, 1972

INVENTOR.
Robert Crehore

By Johnson, Dienner, Emrich, Verbeck & Wagner
Attys

Patented May 30, 1972

TWO-CYCLE ENGINE

BACKGROUND OF THE INVENTION

The present invention relates generally to power engines, and more particularly to a two-cycle engine employing a plurality of arcuately reciprocating pistons and using hydrogen and oxygen vapor gases as fuel.

Numerous engine designs and constructions have been attempted which employ arcuately reciprocating pistons powered in at least one arcuate direction by reaction forces resulting from combustion of input fuels. The prior art radial type engines employ conventional combustion fuels which are admixed prior to introducing them into a combustion chamber for ignition. Admixing of the fuels prior to introduction into the combustion chambers conventionally employs the addition of air with the result that the products of combustion include nitrogen compounds which are exhausted into the atmosphere and add to air pollution. The known radial and arcuate type engines rely upon mechanical means for returning the pistons to their positions of maximum compression preparatory to power strokes. Such mechanical means include linkage arrangements which in the most part are highly susceptible to breakage or other damage requiring replacement or repair. The present invention overcomes the disadvantages of the prior art devices by providing an engine which uses hydrogen and oxygen vapor gases as fuel whereby to eliminate exhaust pollutants, and employs novel components which rely upon self produced gas pressure to maintain reciprocating movement of the arcuately displaced pistons.

SUMMARY OF THE INVENTION

One of the primary objects of the present invention is to provide a two-cycle engine utilizing molecular hydrogen and oxygen gases as fuel components in a manner to substantially reduce the introduction of pollutants into the atmosphere.

Another object of the present invention is to provide a two-cycle engine of the arcuate piston type employing novel valve control means to effect the introduction of molecular hydrogen and oxygen gases into combustion chambers associated with arcuately reciprocating pistons.

Another object of the present invention is to provide a two-cycle engine of the arcuate piston type employing two banks of pistons interconnected in a manner such that one bank of pistons is moved arcuately in a compression stroke as the opposite bank of pistons is moved arcuately in an expansion stroke, arcuate reciprocating movement of the banks of pistons being effected solely from gas pressures established within combustion chambers associated with the pistons.

Another object of the present invention is to provide a two-cycle arcuate piston type engine as described which employs novel exhaust valve means adapted to effect reductions in vapor pressures within the combustion chambers while preventing complete purging or scavenging of the products of combustion.

Still another object of the present invention is to provide a two-cycle arcuate piston engine employing output shaft means rotatably driven through unidirectional clutch means, the output shaft means being adapted for direct coupling to axles or drive wheels of road vehicles and the like. Another object of the present invention is to provide a two-cycle arcuate piston engine as described employing at least two banks of pistons with each bank having an output shaft associated therewith in a manner to allow differential rotational movement of the output shafts.

In carrying out the objects and advantages of my invention, I provide a two-cycle engine having a housing which defines at least two banks of arcuate piston chambers adapted to receive pistons therein for arcuate reciprocating movement about the longitudinal axis of the engine. The pistons of each bank are interconnected through a hub having an annular bevel gear thereon. A plurality of idler bevel gears are rotatably supported by the housing and interconnect the hub bevel gears such that equal but opposite arcuate motion of the banks of pistons is effected. A pair of inlet ports communicate with each of the combustion chambers and have fuel control spool valve means individually associated therewith to allow the separate introduction of molecular hydrogen and oxygen gas under pressure into the combustion chambers. Glow plugs are disposed within each of the combustion chambers and are maintained at temperatures sufficient to effect ignition of the oxygen and hydrogen molecular gases as they are introduced into the combustion chambers. Exhaust valves are provided in communication with the piston chambers such that each exhaust valve is exposed to the associated combustion chamber when the associated piston reaches substantially its full expansion stroke position, each exhaust valve being adapted to reduce the vapor pressure within the associated combustion chamber when exposed thereto to a predetermined value greater than zero. The spool valves associated with each pair of inlet ports are interconnected and operated by an arcuately movable arm affixed to an associated idler bevel gear shaft such that the valve spools are caused to introduce hydrogen and oxygen fuel gases into the associated combustion chamber in predetermined timed relation to movement of the corresponding piston during a compression stroke. An alternative feature provides an output shaft supported directly through the housing such that heavy loads applied to the housing are transmitted directly to wheels or other means directly connected to the output shaft.

Further objects and advantages of my invention, together with the organization and manner of operation thereof, may best be understood by reference to the following description, taken in conjunction with the accompanying drawings wherein like reference numerals designate like parts throughout the several views.

DESCRIPTION OF PREFERRED EMBODIMENTS

Figure 1:
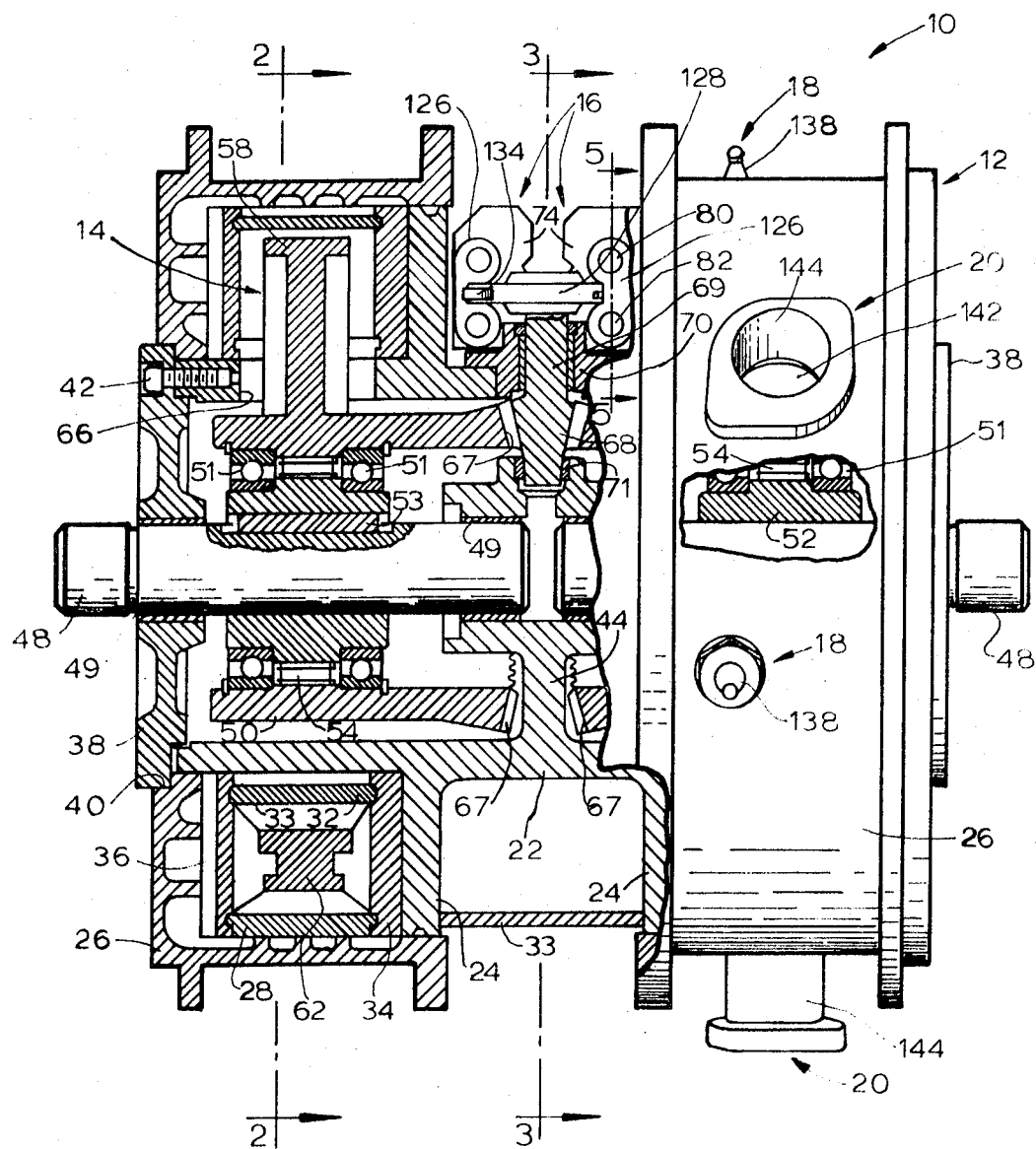
FIG. 1 is an elevational view of one embodiment of an engine in accordance with the present invention, a portion of the engine being shown in longitudinal section.
Figure 2:
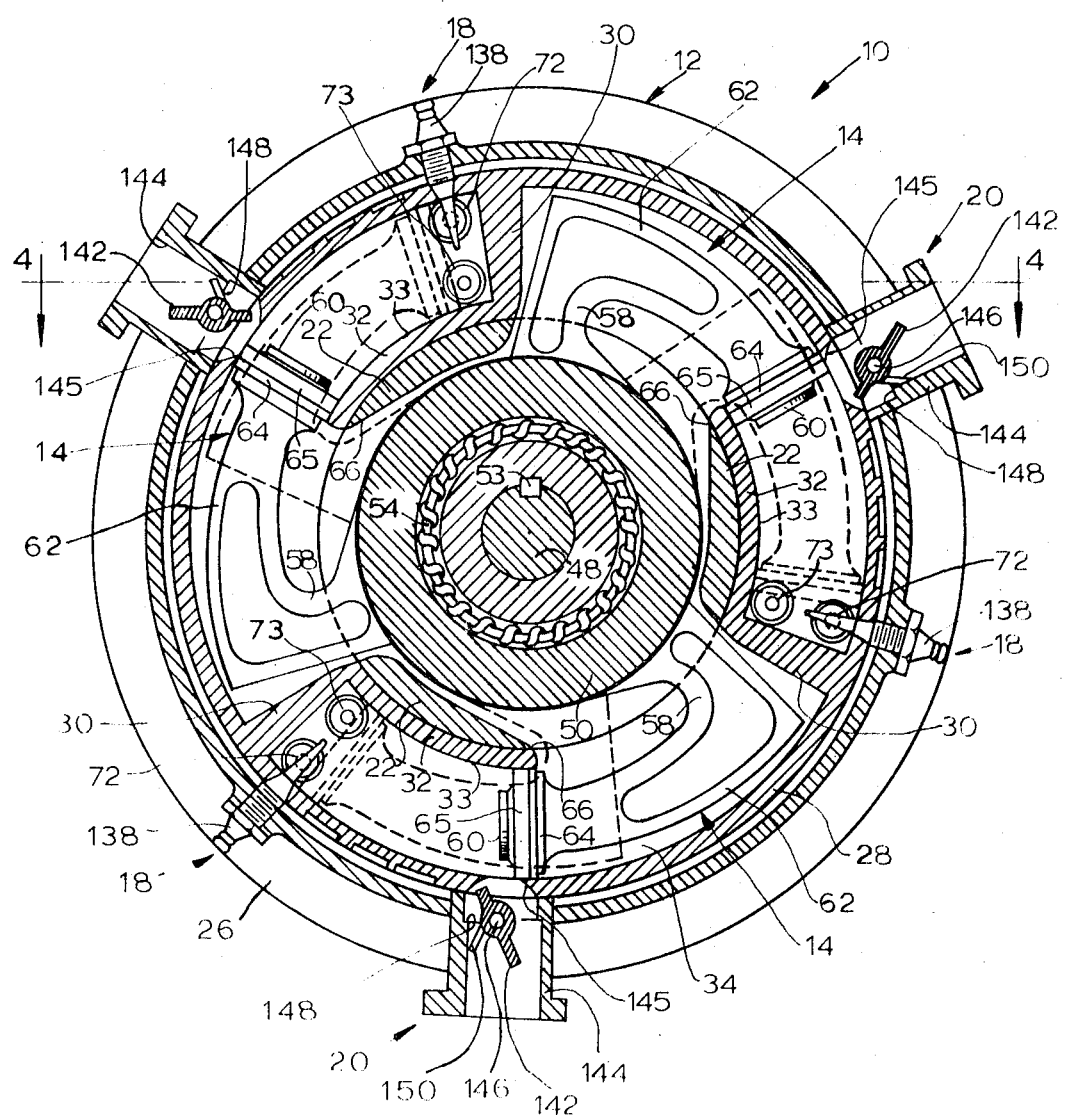
FIG. 2 is a transverse sectional view taken substantially along the line 2—2 of FIG. 1, looking in the direction of the arrows.

Referring now to the drawings, and in particular to FIGS. 1 and 2, an engine in accordance with one embodiment of my invention is indicated generally at 10. The engine 10 is a two-cycle type which employs arcuately reciprocating pistons as the prime movers, the pistons being selectively connected to output shafting and the like for effecting mechanical work. The engine employs molecular hydrogen and oxygen as fuel vapor gases which are separately introduced under pressure into combustion chambers. The engine does not scavenge or purge the combustion chambers during operation and does not utilize air or other nitrogen gases in the combustion processes thereby substantially eliminating exhaust of undesirable pollutants into the atmosphere.

The engine 10 includes housing means, indicated generally at 12, which defines at least two banks of arcuate piston chambers; piston means, indicated generally at 14, supported within each bank of piston chambers; fuel inlet control valve means, indicated generally at 16, associated with each of the piston chambers; ignition means, indicated generally at 18, associated with each of the piston chambers; and exhaust valve means, indicated generally at 20, associated with each of the piston chambers. The particular structural details and interfunctional relationships of the housing means, piston means, valve means, ignition means and exhaust valve means will become apparent through the following detailed descriptions thereof.

As noted, the housing means 12 defines at least two banks of piston chambers which, for purposes of description, will be referred to as a first or left-hand bank and a second or right-hand bank of piston chambers, considered in FIG. 1. While the engine 10 is illustrated as having only two banks of piston chambers, it will be understood that the engine may include more than two banks of piston chambers which are axially aligned in similar fashion to the pair of piston chamber banks illustrated in the drawings. The housing means 12 includes a generally annular core member 22, the longitudinal axis of which defines the longitudinal axis of the engine 10. The core member 22 has annular flange portions 24 which lie in parallel planes perpendicular to the longitudinal axis of the housing 12. A pair of annular end covers 26 are received over opposite ends of the core member 22 and define generally annular cavities or chambers therewith.

Each of the annular chambers defined by the housing means 12 receives piston chamber defining means therein comprising an annular outer liner member 28 having radially inwardly directed portions 30 (FIG. 2) formed integral with or otherwise suitable fixedly secured to the annular portion 28. Each of the radial portions 30 has an arcuately extending inner liner member 32 formed integral therewith, each of the arcuate inner liner portions 32 having an outer surface 33 parallel to the inner annular surface of the liner member 28. Noting FIG. 1, inner and outer end liners 34 and 36, respectively, are sealingly secured to and cooperate with the liner member 28, the radial portions 30 and inner liner portions 32 to define arcuate piston chambers within the housing means 12.

FIG. 2 illustrates three such arcuate piston chambers defined with each bank of the housing means 12, each piston chamber having a generally rectangular or square cross section, considered in the plane of FIG. 1. The longitudinal arcuate axes of the piston chambers of each bank lie on a common diameter about the longitudinal axis of the housing means 12 and in a plane perpendicular to the longitudinal axis of the housing means. The piston chambers of the two banks of chambers illustrated are in identical angular relation to the housing means 12 such that the piston chambers are in parallel generally side-by-side relation. The end covers 26 are suitably retained on the core member 22 as by end caps 38 (FIG. 1) which engage annular shoulders 40 in the end covers and are secured to the outermost axial ends of the core member 20 through bolts 42.

The core member 22 has a radially inwardly directed flange portion 44 the innermost end of which terminates in an annular boss 46 having a central axis coinciding with the longitudinal axis of the housing means 12. The boss portion 44 of the core member 22 cooperates with the end caps 38 to rotatably support a pair of axially aligned output shafts 48 through sleeve bearings 49.

The piston means 14 disposed within each bank of piston chambers includes an annular hub portion 50 which is supported on the corresponding output shaft 48 through anti-friction bearings 51 and a support hub 52 affixed on the shaft 48 by a key 53. Conventional unidirectional clutch means 54 are disposed between each support hub 52 and the associated piston hub 50 and are adapted to effect unidirectional driving rotational movement of the output shaft 48 during movement of the piston means in their power stroke or expansion directions as will become more apparent hereinbelow. The annular hubs 50 are mirror images of each other and each has three equidistantly circumferentially spaced radially projecting piston arms 58 formed integral therewith. Each radial piston arm 58 has a piston head 60 supported thereon through an arcuately shaped portion 62 such that the piston heads 60 are reciprocally slidable within associated piston chambers as illustrated in FIG. 2. To this end, each piston head 60 has a generally rectangular configuration, considered in a plane transverse to the arcuate axis of the associated support arm 62, and has a wiper seal 64 and piston seal 65 retained about its peripheral surface for engagement with the surfaces defining the associated piston chamber as is known. The seals 64 and 65 on the piston heads 60 serve to prevent escape of gas pressure past the piston heads during expansion and compression strokes of the pistons. It will be appreciated that the core member 22 has arcuate openings at 66 (FIG. 1) to accommodate arcuate movement of the radial piston arms 58 during reciprocating movement of the pistons 60. In the described embodiment of the present invention, the pistons 60 are caused to arcuately reciprocate through approximately about 40 arcuate degrees.

Noting FIG. 1, each of the annular hub portions 50 of the piston means 14 has bevel gear teeth 67 formed annularly on the axial end portion thereof adjacent the inwardly directed flange 44 of the core member 22. The bevel gear teeth 67 are adapted to matingly cooperate with a plurality of rotatable bevel gears 68 having axial shaft portions 69 the opposite ends of which are supported by annular support bushings 70 and 71 retained within the core member 22 adjacent openings in the flange 44 sufficient to receive the bevel gears. The bevel gears 68 are supported such that their axes lie in a plane normal to the longitudinal axis of the housing means 12 and extend radially therefrom. The bevel gears 68 engage the bevel gear teeth 67 on the opposed hub portions 50 of the piston means 14 such that movement of the pistons 60 within either bank of pistons effects equal magnitude arcuate movement of the pistons in the opposite bank in an opposite arcuate direction.

The radially directed portions 30 and arcuately extending inner liner portions 32 of the liner members 28 cooperate with the inner and outer end liners 34 and 36 and associated pistons 60 to define substantially closed combustion chambers the volumes of which vary in relation to the positions of the pistons 60 during reciprocating movement. Noting FIG. 2, each of the combustion chambers defined within the piston chambers has a pair of inlet ports or passages 72 and 73 communicating with the associated combustion chamber for allowing the introduction of separate fuel vapor gases. In the particular embodiment illustrated, the inlet port or passage 72 is employed for the introduction of molecular hydrogen gas in substantially pure state, while the inlet port 73 is utilized for the introduction of molecular oxygen gas in a substantially pure state.

Figure 5:
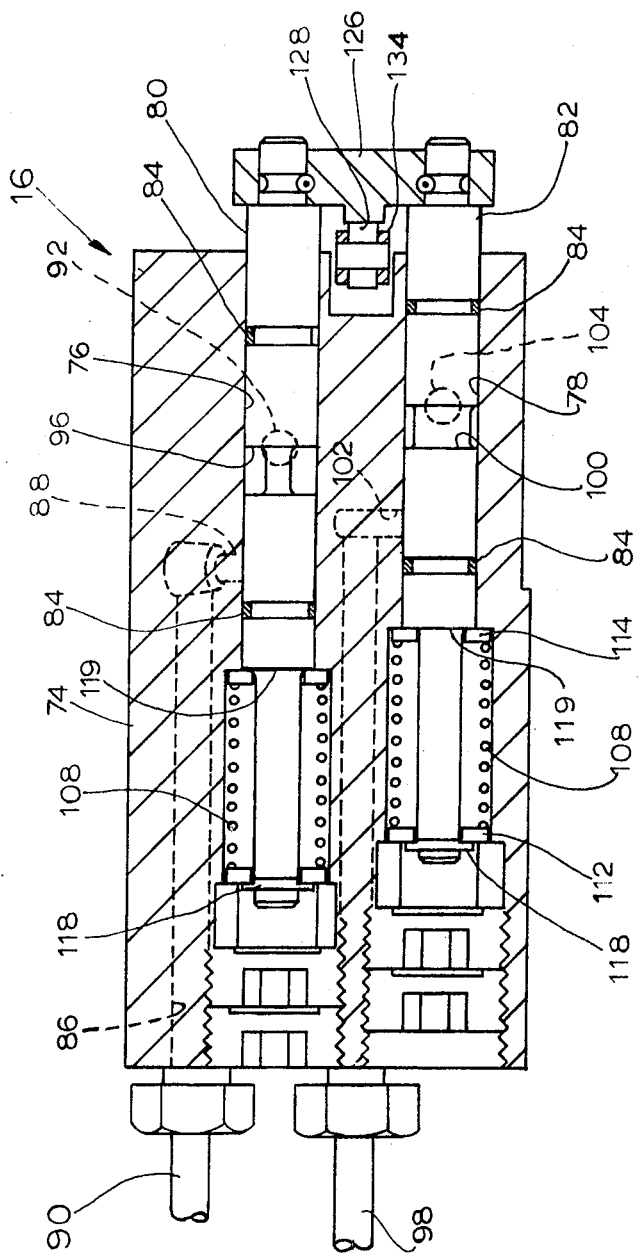
FIG. 5 is an enlarged vertical sectional view through a fuel control valve assembly taken substantially along the line 5—5 of FIG. 1 and looking in the direction of the arrows.
Figure 6:
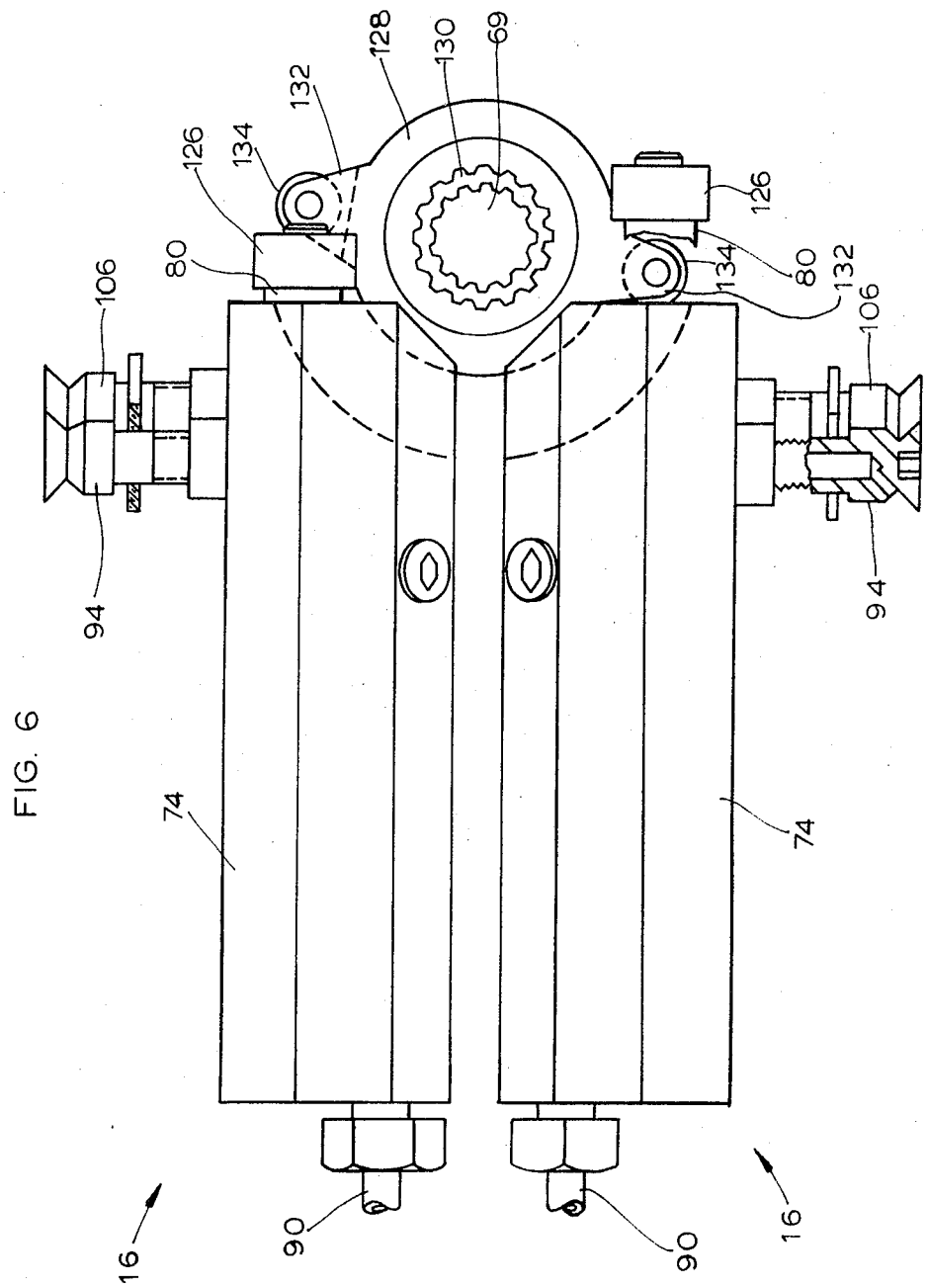
FIG. 6 is an enlarged partial top view showing a pair of fuel control valve assemblies in cooperation with a common actuator arm.

With reference to FIG. 1, taken in conjunction with FIGS. 3 – 6, the annular flange portions 24 of the core member 22 define an annular recess therebetween in which are secured the fuel control valve means 16 associated with each of the fuel inlet ports 72 and 73 to control the introduction of the molecular hydrogen and oxygen fuel gases into the associated combustion chambers. Each of the fuel control valve means 16 includes a valve housing 74 which is suitably secured to an annular flange 24 adjacent the combustion chamber with which the fuel control valve means is associated. The fuel control valve housings 74 associated with the first or left-hand bank of piston chambers are mirror images of and positioned directly opposite the fuel control valve housings 74 associated with the second or right-hand bank of piston chambers, considered in FIG. 1. Noting FIG. 5, each of the fuel control valve housings 74 has a pair of parallel cylindrical bores 76 and 78 therein, the bores being of equal cross sectional area and having their longitudinal axes lying in a common vertical plane. The bores 76 and 78 receive valve spools 80 and 82 therein, respectively, for longitudinal sliding movement, each of the valve spools having annular seal rings 84 disposed within suitable annular grooves in the spools as is known. The cylindrical bore 76 is connected in communicating relation with a source of molecular hydrogen gas under pressure through flow passages 86 and 88 and a suitable tubular conduit 90 secured to the housing 74. The conduit 90 is connected to a commercially available pressure reservoir of molecular hydrogen gas at 2,250 p.s.i.a. through a conventional pressure regulator (not shown) capable of restricting the inlet pressure of hydrogen into the bore 76 to 250 p.s.i.a. An outlet passage 92 in housing 74 intersects the bore 76 and is connected to the hydrogen inlet port 72 of the associated combustion chamber through a suitable spud fitting 94 (FIG. 6). The valve spool 80 has an annulus or annular chamber 96 formed thereabout adapted to receive a predetermined volume of hydrogen gas under pressure when in registry with the flow passage 88, the volume of hydrogen gas so received being transferable to the outlet passage 92 upon movement of the valve spool 80 to a position effecting registration between the annulus 96 and the outlet passage 92.

In similar fashion, the bore 78 in the fuel control valve housing 74 is in communication with a source (not shown) of oxygen gas under pressure through a suitable tubular conduit 98. The source of molecular oxygen gas may constitute a commercially available reservoir of oxygen maintained at substantially about 2,250 p.s.i.a. which is passed through a pressure regulator (not shown) and reduced to 250 p.s.i.a. prior to introduction into the fluid control valve housing 74. The valve spool 82 has an annulus 100 formed in its peripheral surface having a volume preferably equal to one-half of the volume of the annulus 96 in the valve spool 80. The annulus 100 is adapted to receive oxygen gas from an oxygen inlet passage 102, which communicates with the oxygen flow conduit 98, and transfer the volume of oxygen gas received to an outlet passage 104 when the valve spool 82 is moved to a position wherein the annulus 100 is in registry with the outlet passage. The outlet passage 104 is connected to the associated oxygen inlet port 73 through a suitable spud connection 106 (FIG. 6).

The valve spools 80 and 82 are of the balanced type and must be manually moved longitudinally to effect transfer of hydrogen and oxygen from their respective sources to the outlet passages 92 and 104 in the valve housing 74. The valve spools 80 and 82 are normally urged to positions wherein their respective annuluses 96 and 100 are disposed intermediate the associated inlet and outlet passages intersecting the bores 76 and 78 by coil compression springs 108. The opposite ends of the compression springs 108 abut washers 112 and 114 slidably disposed on reduced diameter portions 116 of the valve spools. The washers 112 normally abut retainer rings 118 affixed on the ends of the valve spools, while the washers 114 normally abut annular shoulders 119 formed on the spools. With the valve spools centered by the compression springs 108 as shown in FIG. 5, it can be seen that movement of the respective valve spools in either longitudinal direction will be opposed by the compression springs which urge the valve spools to their centered positions.

Figure 3:
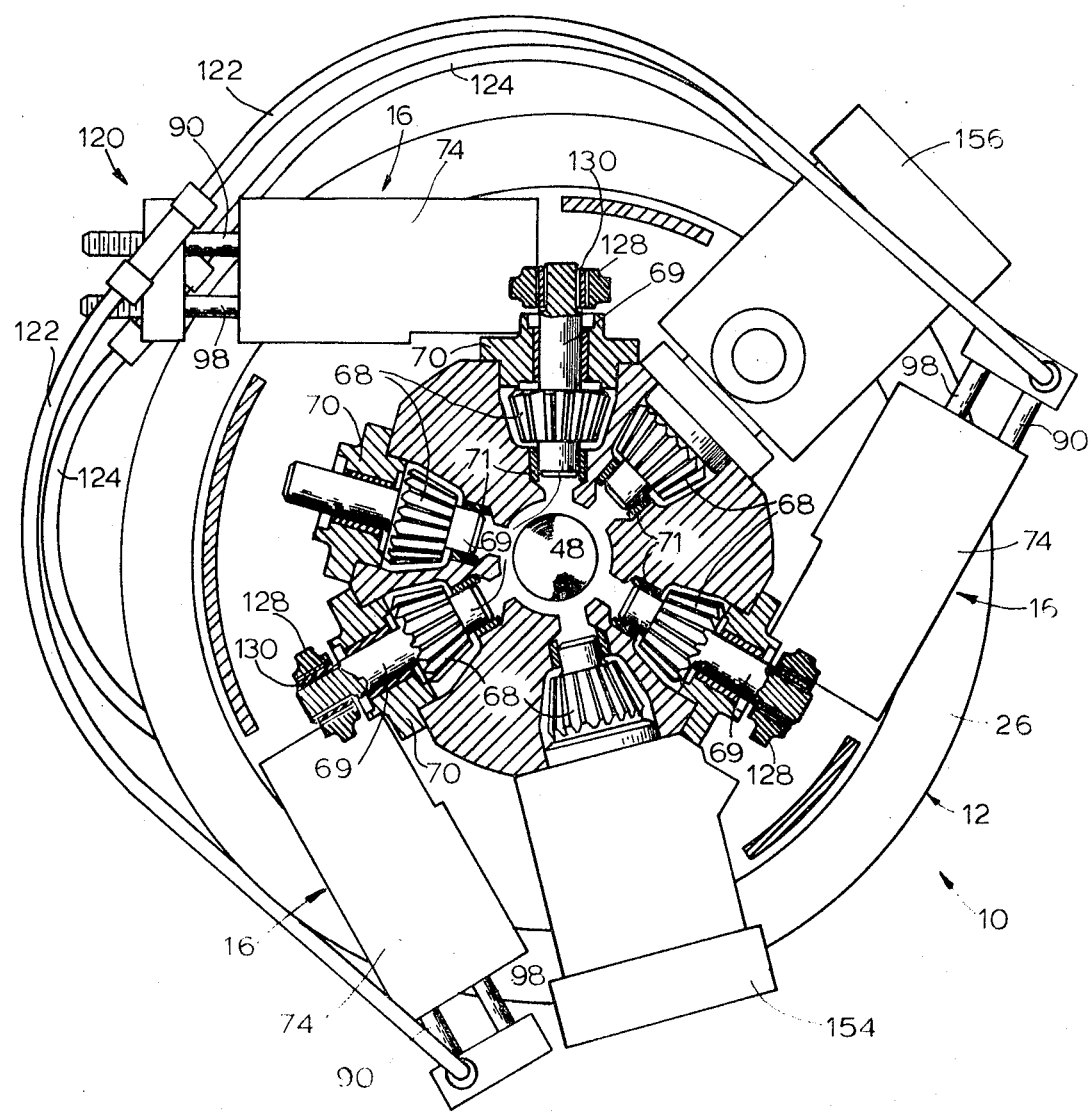
FIG. 3 is a transverse sectional view taken substantially along line 3—3 of FIG. 1, looking in the direction of the arrows.
Figure 4:
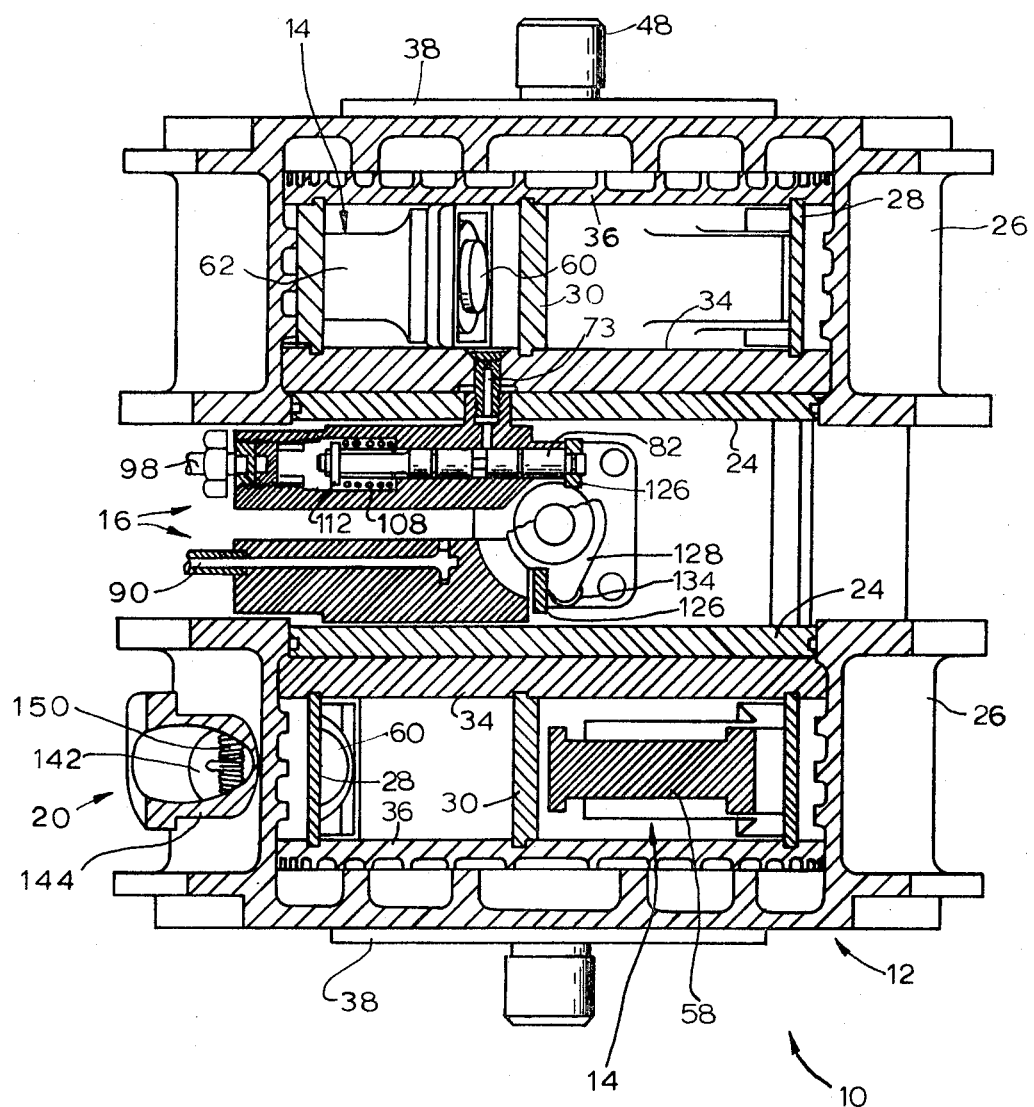
FIG. 4 is a sectional view taken substantially along the line 4—4 of FIG. 2, the viewing plane through the fuel control valve housing being varied at different vertical elevations to more clearly illustrate the fuel inlet passages.

Noting FIG. 3, a manifold arrangement, indicated generally at 120 is preferably connected to the sources of molecular hydrogen and oxygen gases and is adapted to provide flow of the gases to the three fuel control valve means or assemblies 16. To this end, the manifold arrangement 120 may be directly coupled to one of the fuel control valve assemblies 16 and has flow conduits 122 connecting the source of hydrogen gas to the hydrogen inlet passages 90 of the other valve assemblies. In like manner, the manifold arrangement 120 is adapted to provide molecular oxygen gas to the oxygen inlet passages 98 of the respective fuel control valve assemblies 16 through suitable flow conduits 124.

Noting FIG. 1, taken in conjunction with FIGS. 4 – 7, the valve spools 80 and 82 of each of the fuel control valve means 16 are interconnected at their outwardly extending ends by a connecting bar 126 so that movement of the connecting bars effects simultaneous longitudinal movement of the valve spools. One bevel gear 68 is supported between each pair of opposed piston chambers such that its outer shaft end 69 extends intermediate the corresponding valve housings 74. An actuator member 128 is mounted on the upper shaft end 69 of the bevel gear 68 disposed between each pair of valve housings 74, each actuator member 128 being adjustably retained on the associated shaft 69 through a splined drive collar 130 having internal splines to mate with external splines provided on the associated shaft 69 and external splines adapted to mate with internal spline teeth provided within an axial bore in the actuator member. The drive collar 130 and the axial bore in the actuator member 128 are provided with a sufficient number of spline teeth, such as 36 teeth, to allow selective angular adjustment of the actuator member on the bevel gear shaft 69 and thereby provide means for varying the timing relationship of movement of the valve spools 80 and 82 relative to arcuate movement of the piston means 14.

Each actuator member 128 has diametrically opposed radially extending arm portions 132 which rotatably support rollers 134 for engagement with the associated valve spool connecting bars 126 as the actuator members are rotatably oscillated about the axes of the corresponding bevel gear shafts 69. The ratio of the bevel gear teeth 67 on the hubs 50 of the piston means 14 to the bevel gear teeth 68 is preferably 4:1, for example, 60 teeth on each hub 50, and 15 teeth on the bevel gears 68. With the pistons 60 of the piston means 14 being limited in arcuate movement to 40° about the longitudinal axis of the engine 10, the actuator members 128 will undergo an arcuate movement of 160° about their axes of rotation as the pistons move through each 40° stroke. The dimensional configurations of each roller 134 and its associated actuator arm 132 are such that when the pistons of one bank are in their full compression strokes, or substantially top dead center, and the pistons in the opposite bank are in their full expansion positions, the connecting bar 126 and associated valve spools 80 and 82 corresponding to each piston in its full compression position will be disposed in their outermost positions through engagement with the associated rollers 134, whereupon the corresponding annuluses 96 and 100 will communicate with ports 92 and 104. Conversely, the connecting bars 126 and associated valve spools 80 and 82 corresponding to the opposite bank of pistons will be disposed in their innermost positions wherein the associated annuluses 96 and 100 will be in communication with the inlet passages 88 and 102 within the associated fuel control valve housing 74. With the actuator arms in their extreme position limits, a plane containing the axis of rotation of either of the actuator members 128 and also containing the longitudinal axis of the housing 12 will tangentially contact the rollers 134 disposed on diametrically opposite ends of corresponding actuator member 128, with the centers of the diametrically opposed rollers 134 lying on opposite sides of such plane. The thickness of the connecting bars 126 and the radii of the rollers 134 are such that upon full arcuate motion of the associated actuating members 128 through 160°, the rollers will alternatively engage opposite surfaces of the connecting bars and effect longitudinal movement of the associated valve spools 80 and 82 between their operating positions.

The ignition means 18 associated with each of the combustion chambers within the housing means 12 comprises a glow plug 138 which is maintained at a constant temperature to furnish a continual hot spot within the combustion chamber. With reference to FIGS. 1 and 2, the glow plugs 138 are threadedly received within suitable apertures in the end covers 26 and extend radially into the corresponding combustion chambers. The glow plugs 138 are connected to an electrical source, such as an alternator (not shown) which may be driven by one of the output shafts 48 in a conventional manner. The glow plugs are maintained at a temperature above the flash point of hydrogen, preferably about 1,175° – 1,225° F. the glow plugs are supported to project into the piston chambers at positions forward of the pistons 60 when in their maximum compression positions.

The exhaust valve means 20 communicating with each of the piston chambers includes a circular generally planar throttle valve member 142 which is pivotally supported within a tubular exhaust port sleeve 144 secured within a suitable opening in the associated end cover 26. Each tubular exhaust sleeve communicates with the associated piston chamber through a suitable exhaust orifice 145 formed in the outer liner member 28. The axes of the exhaust port sleeves of each bank of pistons extend radially from the longitudinal axis of the housing means 12 and lie in a common plane normal to the longitudinal axes of the housing. Each throttle valve member 142 is pivotable about a cross shaft 146 secured within the associated exhaust sleeve 144 such that the throttle valve members are unbalanced with respect to their pivot axes in an area ratio of approximately 60 to 40 percent. A portion of the peripheral edge surface of each valve member 142 is adapted to engage and seat against a shoulder surface 148 within the associated exhaust sleeve 144 such that the valve members may rotate as illustrated in FIG. 2, the greater area of each valve member being adapted for outward pivotal movement away from the associated piston chamber. A torsion spring 150 is supported about each of the cross shafts 146 and acts between the wall of the associated exhaust port sleeve 144 and the associated throttle valve member 142 to urge the throttle valve member to a position seating against the shoulder 148. The torsion springs 150 exert forces sufficient to close the throttle valve members and maintain them in closed positions until the gas pressures within the associated piston chambers reach values of about 25 p.s.i.a. whereupon the throttle valve members will be forced open to exhaust vapor pressure from the piston chambers. In this manner, it can be seen that the throttle valve members 142 will maintain substantially minimum vapor pressures of 25 p.s.i.a. within the associated combustion chambers when exposed thereto during expansion strokes of the corresponding pistons 60. As noted, the pistons 60 preferably have operative strokes of approximately 40 arcuate degrees. Assuming, for purposes of example, that the pistons have maximum 40° arc movement, the exhaust port orifices 145 are positioned arcuately from the closed end portions of the associated piston chambers such that the exhaust port orifices are initially exposed to the expanding combustion chambers when the pistons reach positions approximately 4.25 arcuate degrees short of their maximum expansion strokes. By closing when the combustion chamber pressures reach a predetermined value, such as 25 p.s.i.a., the throttle valve members 142 do not allow complete scavenging of the associated combustion chambers when exposed thereto, and do not allow air into the combustion chambers during operation of the engine.

FIG. 3 illustrates three bevel gear members 68, one being associated with each of the fuel control valve means or assemblies 16. Additional bevel gear members 68 may be supported by the core member 22 of the housing means 12 for engagement with the bevel gear teeth 67 to drive engine auxiliary equipment such as a lubricating pump 154 and a coolant pump 156 through connection with associated gear shafts 69. The lubricating pump 154 and coolant pump 156, per se, form no part of the present invention and will not be described in greater detail herein.

Having thus described the elements comprising one embodiment of my engine 10, the interrelationship of the components during a cycle of operation will now be briefly described. In initially starting the engine, means (not shown) such as a conventional manually controlled push-pull solenoid are operatively connected to the connecting bar 126 of one of the fuel control valve assemblies 16 in a manner to effect movement of the associated valve spools 80 and 82 to positions wherein their fuel annuluses 96 and 100 are in association with the sources of molecular hydrogen and oxygen gases. The connecting bar 126 is then caused to move to its outer position to effect introduction of the captured fuel vapor gases into the associated combustion chamber through the inlet ports 72 and 73. This procedure is repeated until a sufficient quantity of molecular hydrogen and oxygen fuel gases have been separately introduced into the combustion chamber associated with the manually operated fuel control valve assembly 16 whereupon the glow plugs are energized. With the glow plugs brought to a temperature above the flash point of hydrogen, the piston corresponding to the charged combustion chamber will be forced rearwardly into an expansion stroke due to the reaction forces from ignition of the hydrogen and oxygen cases within the combustion chamber. Movement of this piston in an expansion stroke causes movement of the pistons in the opposite bank to move in compression directions due to the bevel gears 68 intermeshing with the hub gear teeth 67. As the pistons of the opposite bank move through compression strokes, molecular hydrogen and oxygen fuel gases retained in the corresponding valve spool annuluses 96 and 100 are introduced into the associated combustion chambers as aforedescribed whereupon they are ignited to continue engine operation through automatic cycling. Thus, as the pistons on the left bank of the engine approach their exhaust valve ports during their expansion strokes, the pistons in the right-hand bank approach their positions of maximum compression and the actuator members 128 cause the associated valve spools 80 and 82 to move in directions to effect the introduction of molecular hydrogen and oxygen gases into the combustion chambers and to receive new volumes of fuel gases into their annular fuel chambers 96 and 100.

The configurations of the pistons and piston chambers, the relative sizes and positions of the exhaust ports 145, and the angular relation of arcuate movement between the pistons in opposite banks of the engine are such that the molecular hydrogen and oxygen gases introduced into the combustion chambers in one bank of the piston chambers will ignite as the pistons in the opposite bank of the pistons start to uncover their associated exhaust ports 145. The exhaust valve ports and exhaust valves 142 thus exposed to their corresponding combustion chambers immediately reduce the gas pressures therein to slightly greater than 25 p.s.i.a. which constitutes the only force opposing movement of the associated pistons toward their maximum compression positions preparatory to another cycle of engine operation. During such arcuate reciprocating movement of the banks of pistons, their associated output shafts 48 will move in unidirectional rotational directions through the associated unidirectional clutches 54.

As each of the left-hand and right-hand banks of pistons is mounted on a separate output shaft 48 though a unidirectional clutch 54 such that movement of each bank of pistons through an expansion stroke effects driving engagement with its associated output shaft, it will be understood that when one shaft portion 48 is positively driven by its associated bank of pistons, the other shaft portion will be free to rotate in the same direction as the driven shaft, in an opposite direction or not rotate at all. In this manner, differential movement between the aligned output shafts 48 is allowed. Thus, if the engine 10 is used, for example, as the power drive for a road vehicle with each of the shafts being connected in driving relation with a wheel or the like, differential movement of the shafts 48 and their associated wheels is allowed when cornering or otherwise subjecting the shafts to different rotational influences. This ability of the output shafts 48 to undergo differential rotational speeds prevents tire scrub as would otherwise be incurred without separate output shafts 48 for each bank of pistons.

Figure 7:
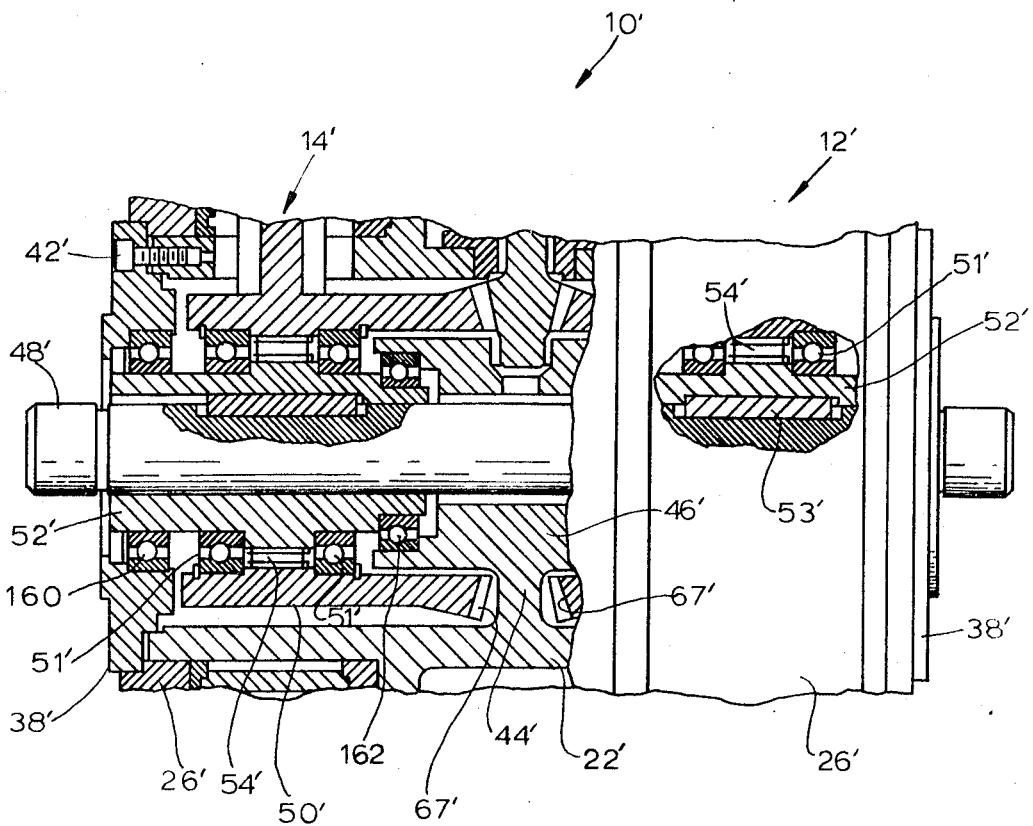
FIG. 7 is a partial elevational view, taken partly in vertical longitudinal section, illustrating an alternative embodiment employing a single output shaft through the engine housing.

FIG. 7 illustrates an alternative embodiment of a two-cycle arcuate piston type engine in accordance with the present invention, elements of the alternative embodiment being indicated with primed reference numerals except for totally new and different components. The embodiment of FIG. 7 differs from the above-described embodiment of FIGS. 1 – 6 primarily in the manner of supporting the piston means 14'. While the embodiment illustrated in FIG. 1 shows each of the piston means 14 supported by an associated output shaft 48 with the output shafts being supported by the housing 12, the piston means 14' of the embodiment of FIG. 7 are supported more directly by the housing 12'. The housing 12' of the embodiment illustrated in FIG. 7 includes a core member 22' having a radially inwardly directed flange portion 44' which terminates in an annular boss 46' having its axis coincident with the longitudinal axis of the housing. The core member 22' has end caps 38' secured thereto as through screws 42' to retain end covers 26' on the core member in similar fashion to the above-described embodiment of FIG. 1.

A pair of elongated annular sleeves 52' are supported in axial alignment by the core member 22' and the associated end caps 38' through radial anti-friction bearings 160 and 162 for rotational movement about their longitudinal axes. Each of the sleeves 52' supports a piston means 14' through anti-friction bearings 51' such that each of the piston means is supported directly by the housing means 12' through a support sleeve 52' and associated bearings. A unidirectional clutch 54' is provided between each of the piston means 14 and the associated support sleeve 52' such that unidirectional rotational movement of the sleeves 52' will be effected upon arcuate reciprocating movement of the piston means as above described.

The engine embodiment illustrated in FIG. 7 employs a single unitary driven shaft 48' which extends longitudinally within the axial aligned bores of the sleeves 52'. The driven shaft 48' is coupled to the sleeves 52' through keys 53' such that rotational movement of the sleeves 52' will effect a corresponding simultaneous rotational movement of the driven shaft 48'. In other respects, the engine embodiment illustrated in FIG. 7 is identical to that described above with respect to FIGS. 1 – 6. In the engine embodiment of FIG. 7, any external loads applied to the housing 12' will be transferred directly through the output shaft 48' to mechanism coupled thereto without significantly loading the piston means 14'. The engine illustrated in FIG. 7 finds particular application where it is desired to secure the housing 12' directly to the frame structure of a heavy driven vehicle or the like, with the output shaft 48' being coupled directly to ground engaging means such as drive wheels.

While I have described and illustrated various embodiments of my invention, it will be understood to those skilled in the art that changes and modifications may be made therein without departing from the invention in its broader aspects.

I claim:

1. A two-cycle engine for use with molecular fuel gases, comprising, in combination, housing means having a longitudinal axis and defining at least first and second banks of piston chambers, each bank of piston chambers including a plurality of piston chambers each having a substantially closed end portion defining a combustion chamber, piston means supported within each bank of piston chambers and including a piston received within each of said piston chambers for arcuate reciprocating movement therein, the pistons disposed within each bank of piston chambers being interconnected for conjoint reciprocating movement, means interconnecting the piston means of said banks such that arcuate movement of a piston in one bank effects equal magnitude arcuate movement of the pistons in the other bank in an opposite arcuate direction, a plurality of inlet ports communicating with each of said combustion chambers for allowing the introduction of separate fuel vapor gases into the associated combustion chambers, fuel control valve means associated with each of said inlet ports and adapted to effect the introduction of a separate fuel vapor gas into the corresponding inlet port, ignition means associated with each of said combustion chambers for effecting ignition of fuel vapor gases introduced into said combustion chambers, and exhaust valve means communicating with each of said piston chambers, each of said exhaust valve means being exposed to the combustion chamber of the associated piston chamber as the corresponding piston reaches a predetermined position during an expansion stroke, said exhaust valve means of each bank of piston chambers being positioned such that maximum exposure to the corresponding combustion chambers is effected when the pistons of the other bank of piston chambers begin their expansion strokes due to the reaction forces of combustion of fuel vapor gases, each of said exhaust valve means being adapted to open at a predetermined vapor pressure within the associated combustion chamber when exposed thereto and reduce the vapor pressure to a predetermined value greater than zero, said reduced vapor pressures acting on the associated pistons constituting the sole forces opposing movement of said associated pistons in a compression direction upon movement of the pistons in the opposite bank in opposite expansion directions by virtue of combustion of fuel gases within their associated combustion chambers.

2. A two-cycle engine as defined in claim 1 wherein said piston means include annular hub portions disposed coaxially to the longitudinal axis of said housing means, said hub portions having gear teeth on opposing end portions thereof, and wherein said means interconnecting the piston means of said banks includes pinion gear means supported by said housing for engagement with said gear teeth of said hub portions such that arcuate movement of either of said hub portions about its axis effects movement of the other hub portion in an opposite arcuate direction.

3. A two-cycle engine as defined in claim 2 wherein the axes of said pinion gears means lie in a common plane perpendicular to the longitudinal axis of said housing means.

4. A two-cycle engine as defined in claim 3 wherein said pinion gear means includes a pinion gear corresponding to each of said piston chambers, and including means interconnecting each of said fuel control valve means with a pinion gear to effect the introduction of said fuel vapor gases into the corresponding combustion chambers in direct relation to reciprocating movement of the piston disposed within the corresponding piston chamber.

5. A two-cycle engine as defined in claim 4 wherein said gear teeth on said hub portions have a gear ratio relative to each of said associated pinion gears of 4:1.

6. A two-cycle engine as defined in claim 4 wherein said means interconnecting each of said fuel control valves with a pinion gear includes collar drive means disposed on said pinion gear and adjustable to alter the timing relationship between movement of said pinion gear and the associated fuel control valve means.

7. A two-cycle engine as defined in claim 5 wherein two inlet ports are provided in communicating relation with each of said combustion chambers, and wherein said valve means associated with each of said inlet ports comprises a spool valve operatively connected to the pinion gear associated with the corresponding combustion chamber such that each of said spool valve means is caused to introduce a fuel vapor gas into the associated inlet port in predetermined relation to the arcuate position of the associated piston during reciprocating movement thereof.

8. A two-cycle engine as defined in claim 1 wherein each of said piston means includes an annular hub portion having an axis coincident with the longitudinal axis of said housing means, and including shaft means disposed within each of said annular hub portions, and unidirectional clutch means supported within each of said hub portions for cooperation with the associated shaft means to effect unidirectional rotational movement of said shafts during arcuate reciprocating movement of said pistons.

9. A two-cycle engine as defined in claim 1 including shaft means supported by said housing for rotational movement coincident with the longitudinal axis of said housing means, and including unidirectional clutch means operatively interconnecting said shaft means and said piston means for effecting unidirectional movement of said shaft means upon arcuate reciprocating movement of said pistons.

10. A two-cycle engine as defined in claim 1 wherein said exhaust valve means includes spring means urging said valve means to closed positions, said spring means being characterized by exerting greater closing biasing forces as said valve means are opened upon exposure to the associated combustion chambers.

11. A two-cycle engine as defined in claim 1 wherein said ignition means includes glow plugs continually maintained at temperatures sufficient to effect combustion of the fuel vapor gases as they are introduced into the corresponding combustion chambers through said inlet port means.

12. A two-cycle engine for use with molecular hydrogen and oxygen fuel gases, comprising, in combination, housing means having a longitudinal axis and defining at least first and second banks of arcuate piston chambers, piston means disposed within each bank of piston chambers and including a piston received within each of said piston chambers for arcuate reciprocating movement therein, said pistons disposed within each of said banks of piston chambers being interconnected for conjoint reciprocating movement, means interconnecting the pistons disposed within said banks of piston chambers such that reciprocating movement of a piston in one of said banks of piston chambers effects equal magnitude arcuate movement of the pistons disposed in the other bank of piston chambers in an opposite arcuate direction, a hydrogen inlet port and an oxygen inlet port communicating with each of said combustion chambers for allowing the separate introduction of molecular hydrogen and oxygen vapor gases into the corresponding combustion chamber, valve means associated with each of said inlet ports, said valve means associated with said hydrogen inlet ports being adapted to effect introduction of a predetermined volume of hydrogen vapor gas under pressure into the corresponding combustion chamber, said valve means associated with said oxygen inlet ports being adapted to effect introduction of a predetermined volume of oxygen under pressure into the corresponding oxygen inlet port, said volume of oxygen introduced being equal to one-half the volume of hydrogen introduced, ignition means associated with each of said combustion chambers and adapted to effect ignition of said hydrogen and oxygen vapor gases after they are introduced into the corresponding combustion chamber, exhaust valve means communicating with each of said piston chambers and adapted to be exposed to the corresponding combustion chamber as the associated pistons are moved in arcuate directions during expansion strokes, said exhaust valve means being adapted to reduce the vapor pressures within the combustion chambers when exposed thereto to a predetermined value greater than zero, said pistons of said respective banks of pistons being synchronized such that the exhaust valve means of one bank of pistons are subjected to maximum exposure to their corresponding combustion chambers as the pistons of the opposite bank of piston cambers are subjected to reaction forces from combustion of the hydrogen and oxygen vapor gases introduced into the corresponding combustion chambers, shaft means supported by said housing means for rotational movement about the longitudinal axis of said housing means, and means interconnecting said shaft means and said banks of pistons to effect unidirectional movement of said shaft means upon reciprocating movement of said pistons.

* * * * *